No. 629,971. Patented Aug. 1, 1899.
A. A. STROM.
ACETYLENE GAS APPARATUS.
(Application filed Feb. 11, 1899.)
(No Model.) 3 Sheets—Sheet 3.

Witnesses.
R. D. Spencer
D. W. Lee

Inventor.
Axel A. Strom
by Dyrenforth & Dyrenforth
Atty's

UNITED STATES PATENT OFFICE.

AXEL A. STROM, OF AUSTIN, ILLINOIS, ASSIGNOR TO THE WALMSLEY & COMPANY, OF CHICAGO, ILLINOIS.

ACETYLENE-GAS APPARATUS.

SPECIFICATION forming part of Letters Patent No. 629,971, dated August 1, 1899.

Application filed February 11, 1899. Serial No. 705,242. (No model.)

*To all whom it may concern:*

Be it known that I, AXEL A. STROM, a citizen of the United States, residing at Austin, in the county of Cook and State of Illinois, have invented a new and useful Improvement in Acetylene-Gas Apparatus, of which the following is a specification.

The more important objects of my invention are to provide for connecting a plurality of carbid-holders or generators proper of practical size with a gasometer and to provide a gasometer with a novel and reliably-operative safety-escape for excessive gas-pressure.

Figure 1:
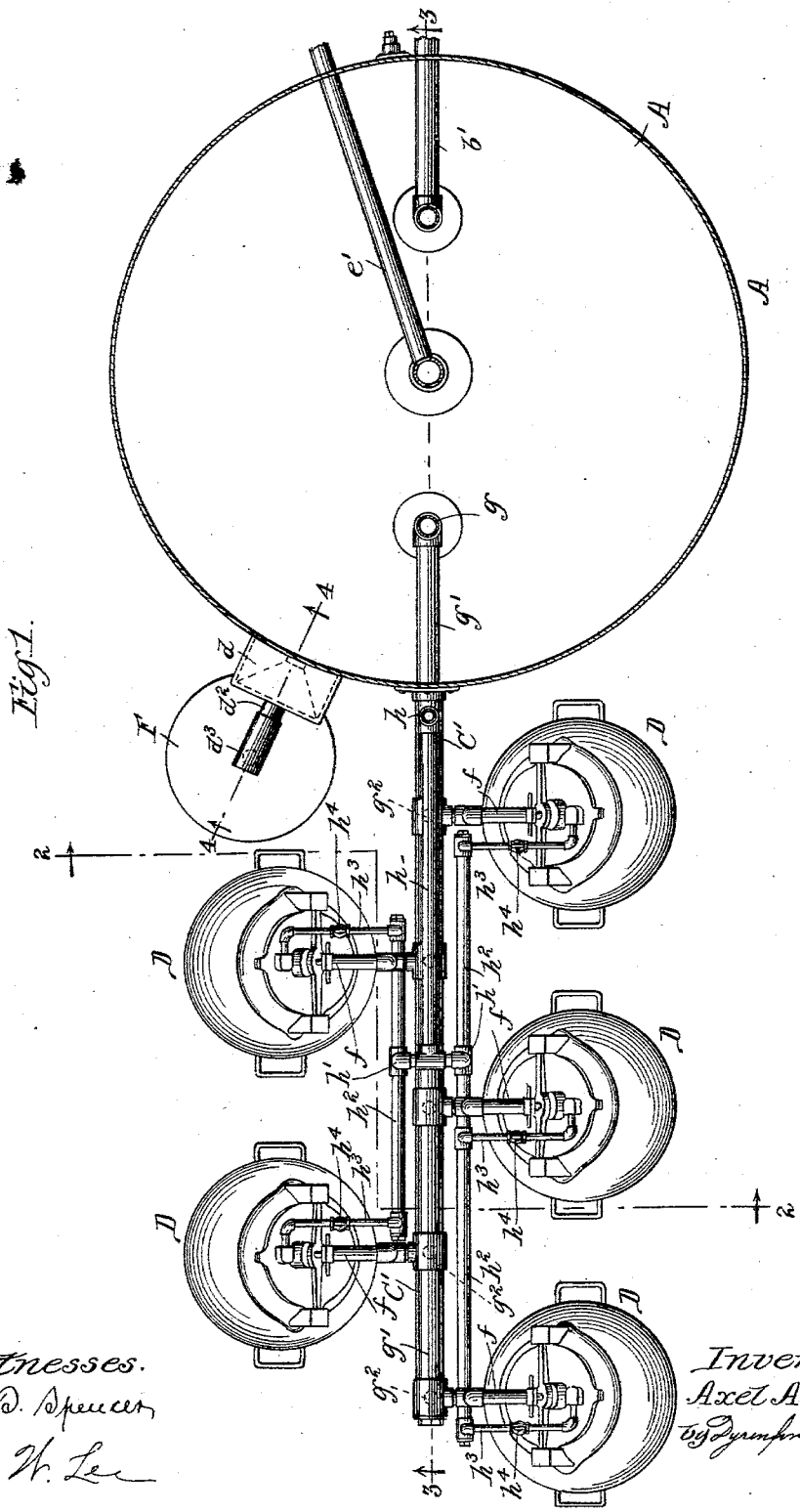
Figure 2:
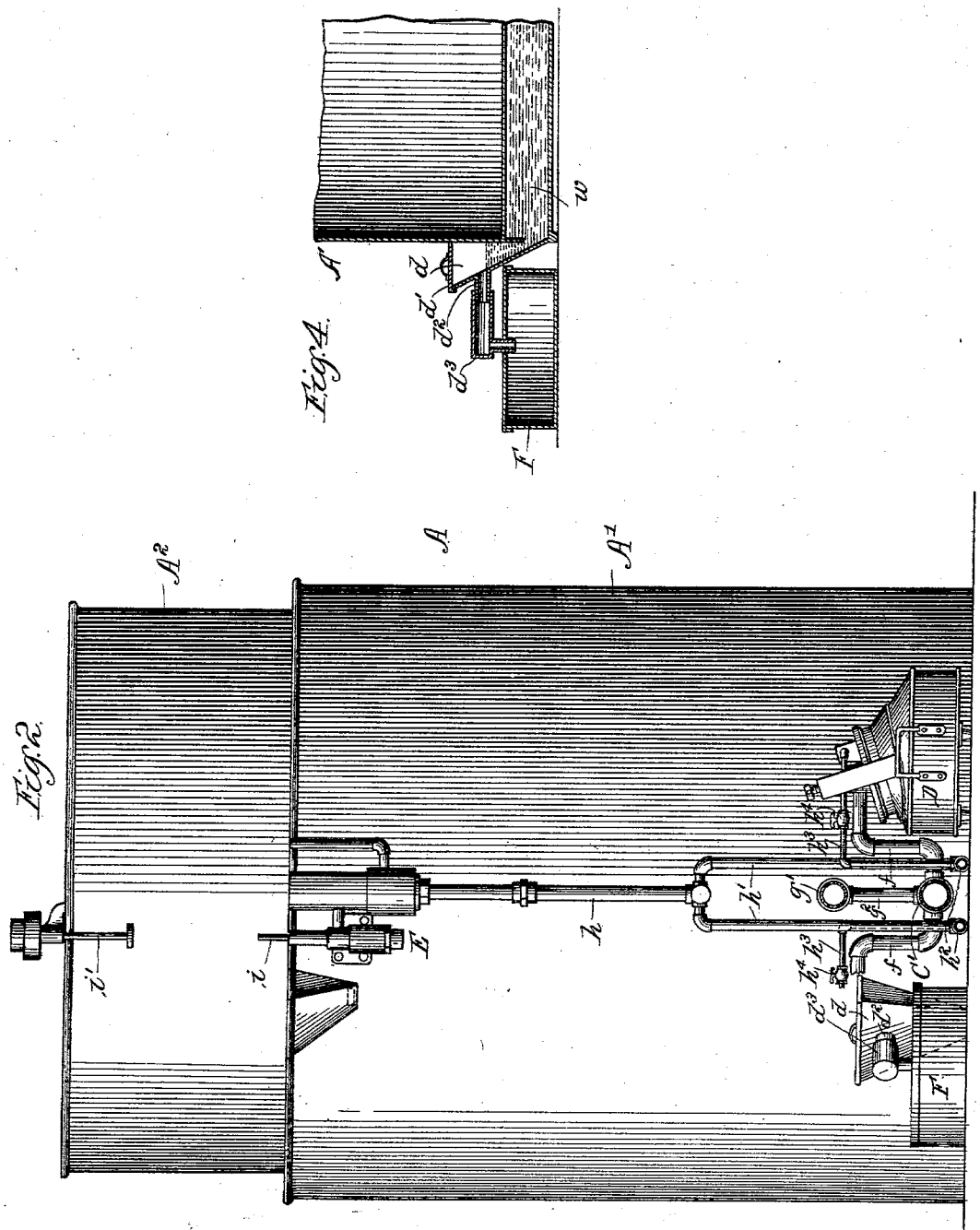
Figure 3:
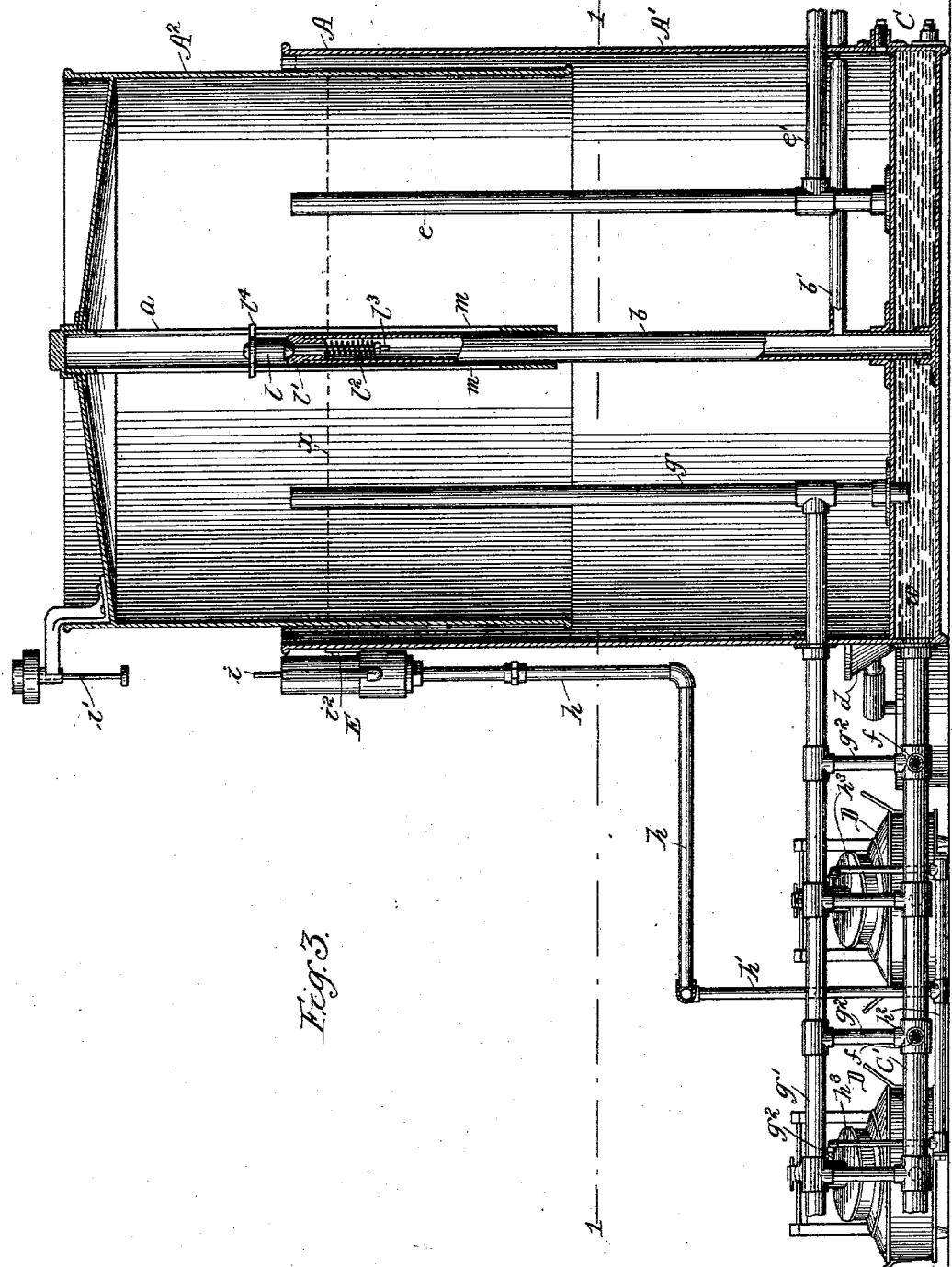

Referring to the accompanying drawings, Figure 1 is a sectional plan view of an acetylene-gas apparatus provided with my improvements; Fig. 2, a section taken at the line 2 2 on Fig. 1 and viewed in the direction of the arrows; Fig. 3, a section taken at the line 3 3 on Fig. 1 and viewed in the direction of the arrows, and Fig. 4 a section taken at the line 4 4 on Fig. 1 and viewed in the direction of the arrows.

A is the gasometer, comprising the lower stationary tank A' and the inverted tank or bell A², telescoping therewith, and carrying a centrally-pendent pipe $a$, telescoping with a pipe $b$, extending upward from the base of the tank A', near which it communicates through a branch pipe $b'$ with the outer air for the escape of excessive gas-pressure in the gasometer. In the base of the tank A' is formed a water-holder C, having an overflow-spout $d$ outside the tank. A gas-outlet pipe $e$, supported on the top of and opening at its lower end into the water-holder, rises above the water-line $x$ in the gasometer and has a branch $e'$ leading to the point or points of gas consumption, burners. (Not shown.)

C' is an extension of the holder C, shown as a pipe, which may be of any desired length, leading outward from the holder, with which it has open communication to receive water from the supply therein, (indicated at $w$.) The water contained in the pipe or conduit C' and which is supplied thereto from the holder C renders it a check against backflow when the carbid-holders are disconnected, as for emptying them of gas from the gas-holder A into the room containing the carbid-holders.

D D are carbid-holders or generators proper of any desired construction and provided in any required number placed at intervals along each side of the extension C' and each communicating therewith through a gas-outlet branch pipe $f$. Above the check-pipe C' and communicating therewith through tubular legs $g^2$, provided at intervals, is supported the pipe $g'$ for conducting the gas as it is generated from the carbid-holders to the gasometer through the vertical pipe $g$, extending therein, upward from the holder C beyond the water-line $x$. The pipe C', legs $g^2$, and pipe $g'$ afford, practically, a single gas-check conduit communicating at its base portion with the holder C and from its upper portion with the pipe $g$, and it is within my invention to provide a single conduit of suitable form to receive the water-supply from the holder and conduct the gas from the carbid-holder into the gasometer instead of the two intercommunicating pipes C' and $g'$. According to the construction illustrated the supply of water for the carbid-holders is taken from the water in the gasometer A through a pipe $h$, into which the water is admitted by way of a valve-controlled chamber (indicated at E) of any suitable construction, but which forms no part of my present invention, being described and claimed in my pending application, Serial No. 699,439, filed December 16, 1898, so that it need not be shown nor described in detail in the present connection. It is sufficient to say that the stem $i$ of the valve in the device E is in alinement with an actuating-rod $i'$, supported on the bell A², whereby when the bell drops far enough under reduction of pressure in the gasometer the rod encounters and depresses the valve-stem $i$ to open the valve and admit water into the chamber from the gasometer through the communication $i^2$ therewith. Any other suitable means for supplying water to the carbid-holders through a pipe $h$ may, however, be employed without departure from my invention. The pipe $h$ has branches $h'$, each terminating in a header or manifold branch $h^2$ for each of the series of carbid-holders D at opposite sides of the plane of the pipe C', and from each branch $h^2$ there lead at intervals into the carbid-holders tubes $h^3$, one for each holder, and which may contain shut-off valves $h^4$. By the construction thus described when by the drop of the bell $A^2$ the valve in the device E is opened to admit water from the gasometer into the pipe $h$ the volume of water composing the charge is conducted throughout the manifold pipes $h^2$, whence it is distributed through the tubes $h^3$ to the carbid-holders, with the advantage that it is supplied to them all uniformly and simultaneously, thereby causing them to operate accordingly. The gas evolved in the carbid-holders passes through the water in the check-pipe C', supplied from the holder C, into the gasometer by way of the legs $g^2$, branch $g'$, and pipe $g$.

To prevent escape into the inclosure or room containing the apparatus of the condensation which finds its way into the holder C through the pipes $g$ and $e$, the spout $d$, from which the odor would thus escape, is closed, as by a cover $d'$, and has a nipple $d^2$ leading from it at a point adjacent to the normal water-line in the spout into an angle-coupling $d^3$, discharging into a tightly-closed box F through its top. This box affords a species of trap or catch-basin for the condensation and may be removed from time to time, as required, to the outer air and uncovered to clean and purify it.

My improved safety-escape device for excessive gas-pressure may be used to advantage with any gas apparatus involving a gasometer having a tank A' and bell $A^2$. As shown in Fig. 3, this device involves the following-described construction: The top of the escape-pipe $b$ is provided with a seat $l'$ for a valve $l$, normally held against its seat by a spring $l^2$, confined about the valve-stem $l^3$, extending downward into the pipe. On the upper end of the valve-head is fastened a cross-bar $l^4$, the ends of which form lateral projections engaging with opposite vertical slots $m$ in the pipe $a$, of a length so proportioned that when the pressure of gas in the bell exceeds the predetermined pressure the consequent rise of the bell brings the lower ends of the slots into engagement with the projecting ends of the cross-bar $l^4$, and the continued rise of the bell lifts the valve to open the pipe $b$ through the slots $m$ to the gas-pressure and permit escape thereof to the outer air until by the resultant fall of the bell the lower ends of the slots are disengaged from the valve, which is thereupon closed by the action of the spring to seal the pipe $b$ against the further escape of gas until there shall be again excessive gas-pressure in the gasometer.

An incidental but very material advantage of the valve structure of safety-escapes is that it avoids the necessity of providing on the upper end of the pipe $b$ a stop to be engaged by an inward-projecting stop on the lower end of the pipe $a$, and thereby prevent undue rise of the bell. The provision of these stops not only adds materially to the cost of manufacture, but the only guide the pipe $a$ has on the pipe $b$ is at these stops. By omitting the stops the pipe $a$ may so closely fit the pipe $b$ as to afford to the movable pipe an extended guide in rising and falling. Since the valve $l'$ encounters the lower ends of the slots $m$ as soon as there is excessive pressure in the bell, the further rise thereof is rendered impossible, and the stops thus become unnecessary.

What I claim as new, and desire to secure by Letters Patent, is—

1. In an acetylene-gas apparatus, the combination with a gasometer of a separate water-holder formed in the base of the stationary tank, a gas-pipe extending upward in the gasometer from and communicating with said water-holder, a gas-check conduit connected with and receiving its water-supply from said holder and communicating with said pipe, and a carbid-holder communicating with said conduit.

2. In an acetylene-gas apparatus, the combination with a gasometer having a gas-inlet pipe and a water-holder in its base, of a pipe forming an extension of said holder outside the gasometer, a pipe connected at intervals with said extension and opening into said inlet-pipe, and a plurality of carbid-holders connected with said extension, substantially as described.

3. In an acetylene-gas apparatus, the combination with a gasometer having a gas-inlet pipe and a water-holder in its base, of a pipe forming an extension of said holder outside the gasometer, tubular legs branching at intervals from said extension and a pipe communicating therewith through said legs and opening into said inlet-pipe, and carbid-holders at opposite sides of and connected with said extension, substantially as described.

4. In an acetylene-gas apparatus, the combination with a gasometer having a gas-inlet pipe, and a water-holder in its base, of an extension of said holder outside the gasometer and communicating with said inlet-pipe, a plurality of carbid-holders at intervals along opposite sides of and communicating with said extension, and means for distributing water to said holders, comprising a pipe communicating at one end with a water-supply and having branches at its opposite end, pipes extending along the series of carbid-holders and into which said branches open, and a tube for each carbid-holder leading thereto from said pipes.

5. In an acetylene-gas apparatus, the combination with a gasometer having a water-holder in its base, of an external covered spout communicating with said holder and a sealed box, forming a trap for the condensation, communicating with said spout, substantially as described.

6. In an acetylene-gas apparatus, the combination with a gasometer having a water-holder in its base, of an external covered spout communicating with said holder, a box provided with a removable cover and forming a sealed trap for the condensation, and a connection between said spout and box, substantially as described.

AXEL A. STROM.

In presence of—
  M. J. FROST,
  R. I. SPENCER.